March 23, 1954    C. H. JORGENSEN ET AL    2,672,851
PRESSURE REGULATOR
Filed April 11, 1945            6 Sheets-Sheet 4
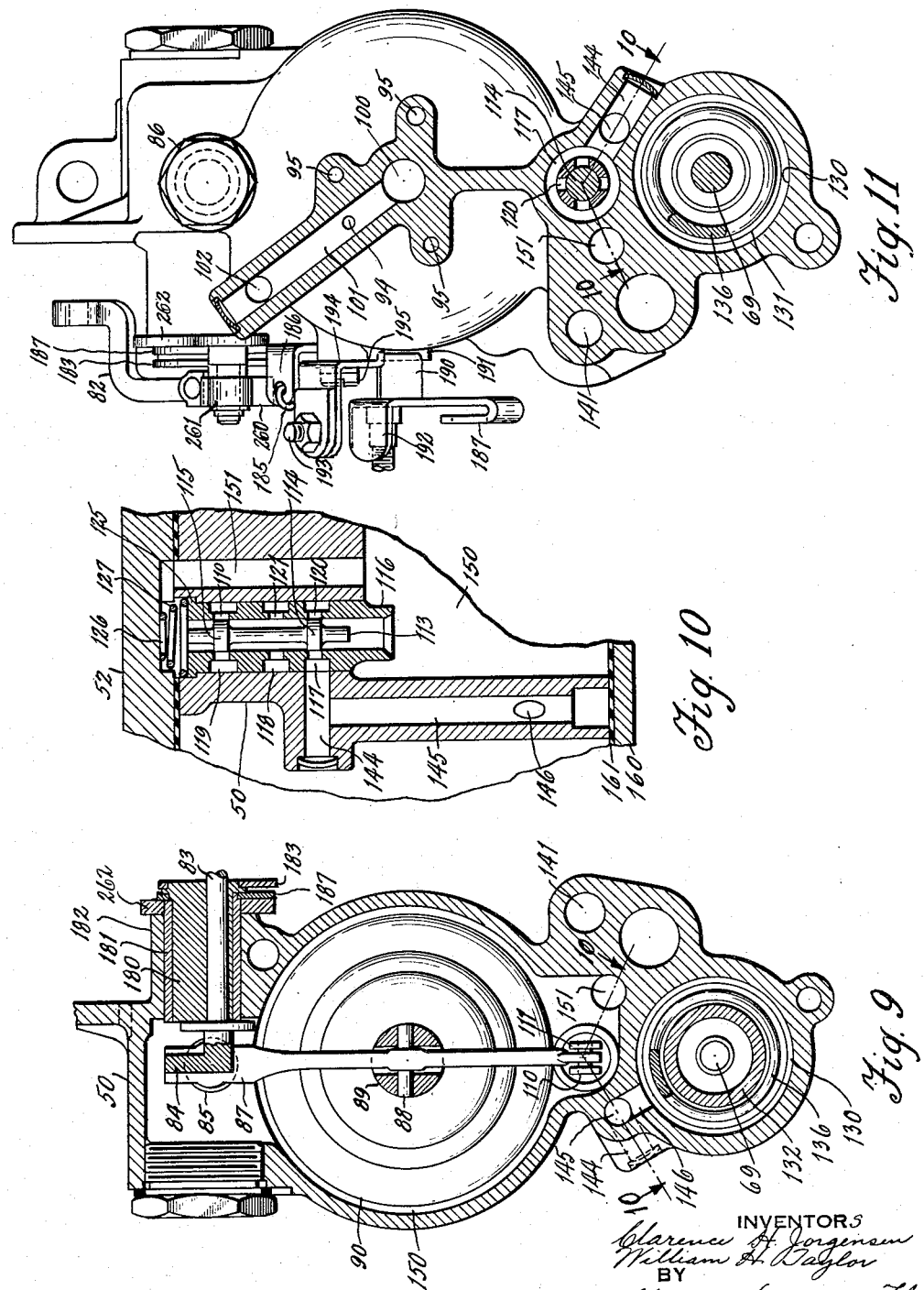

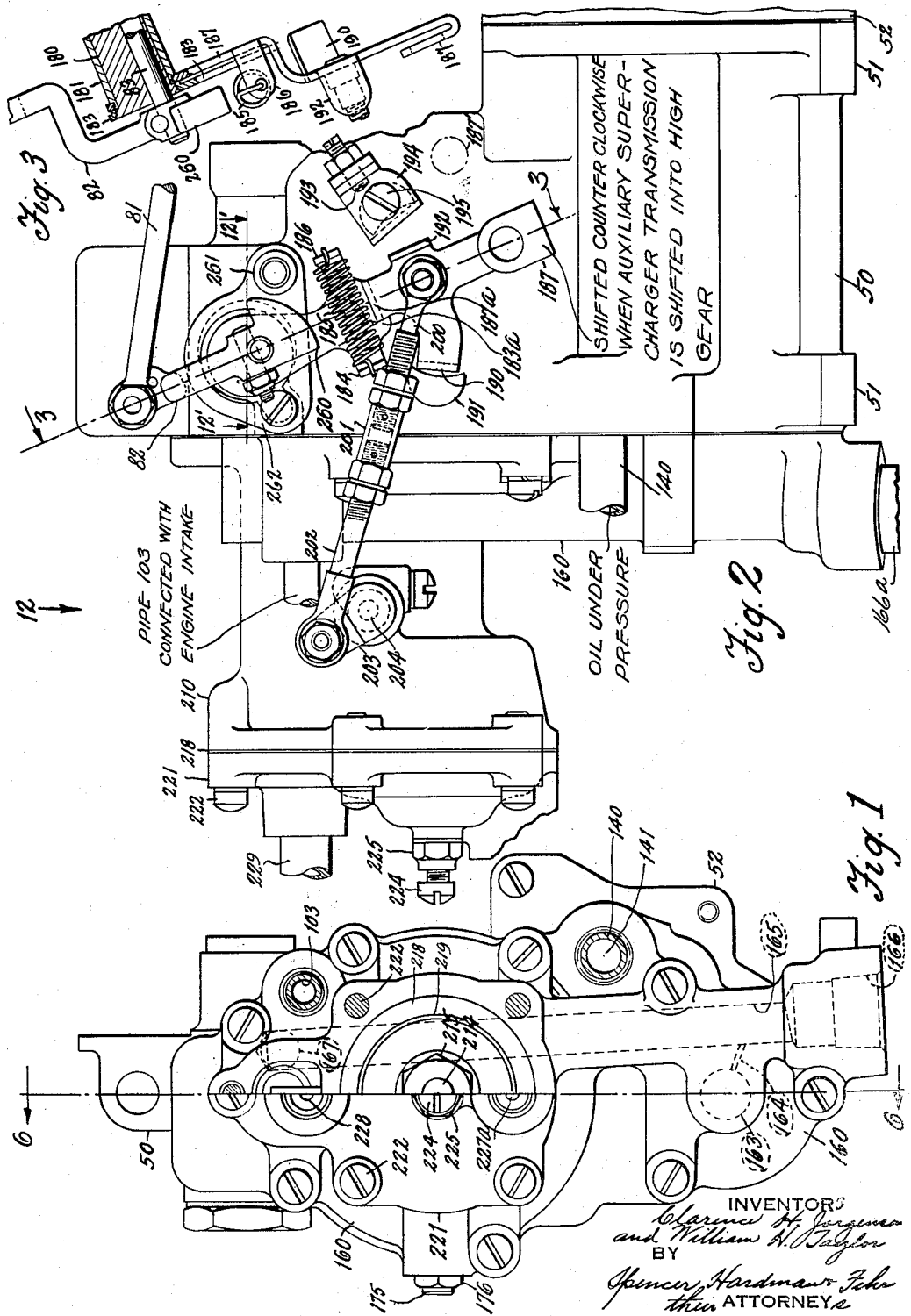

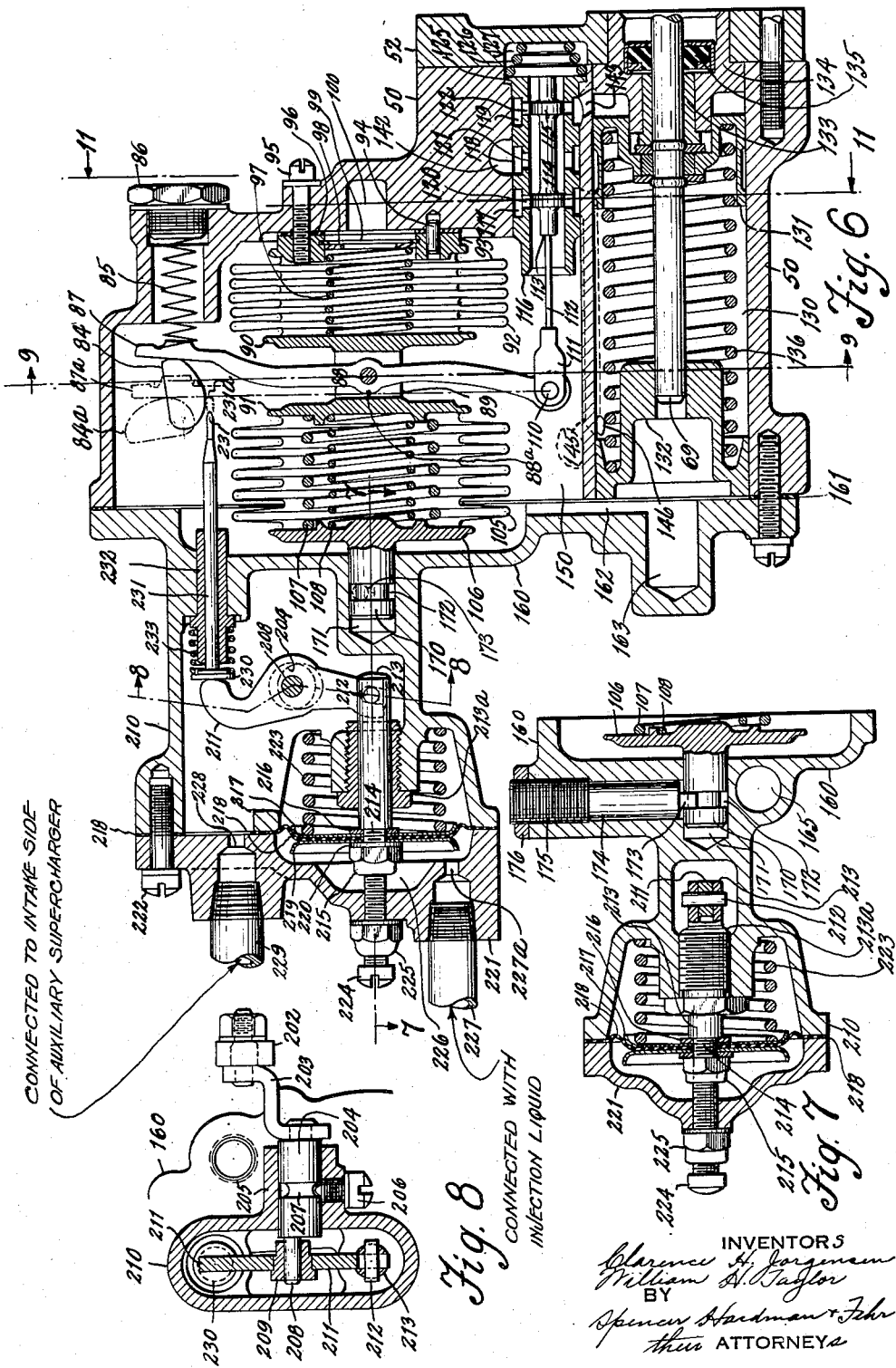

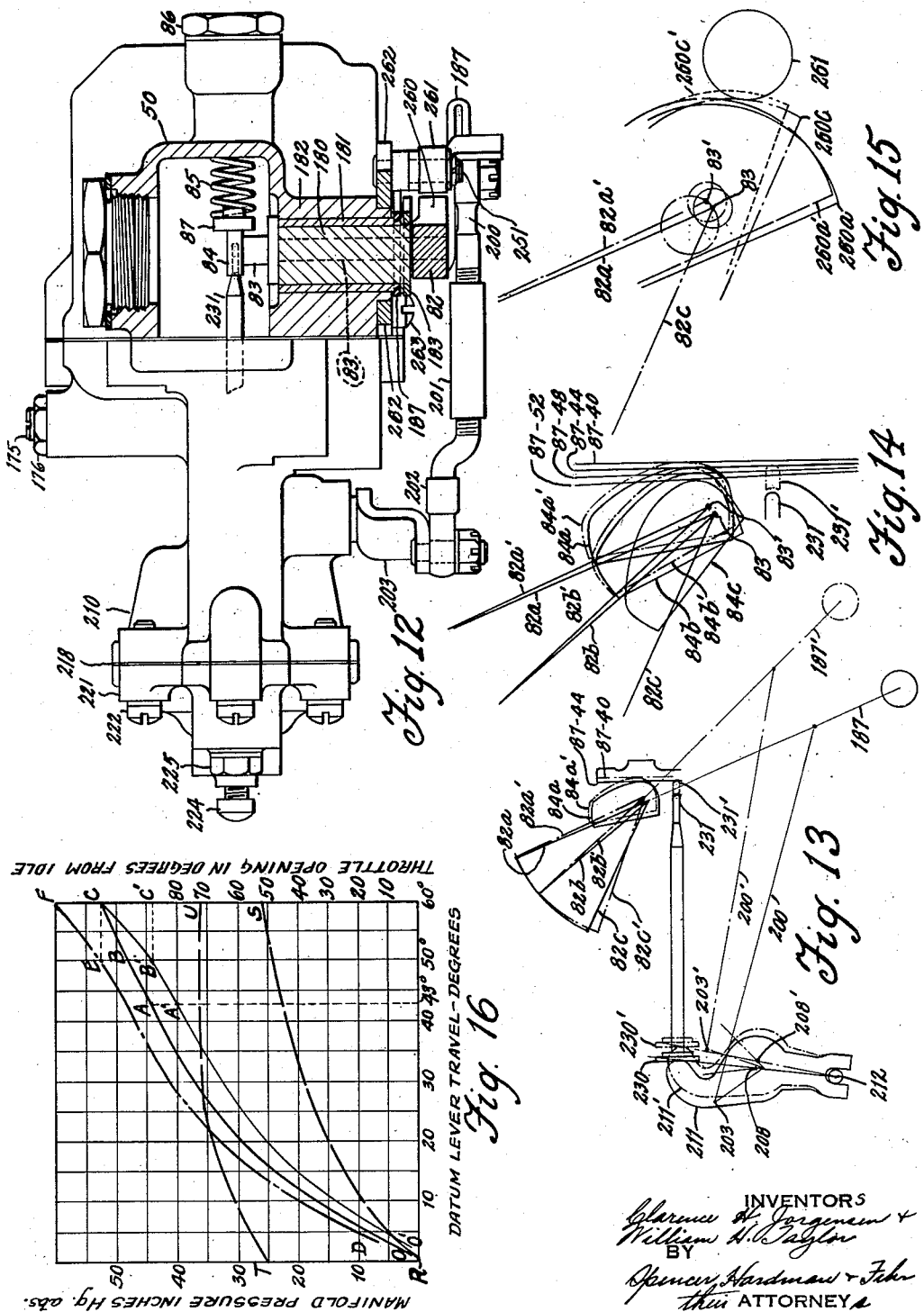

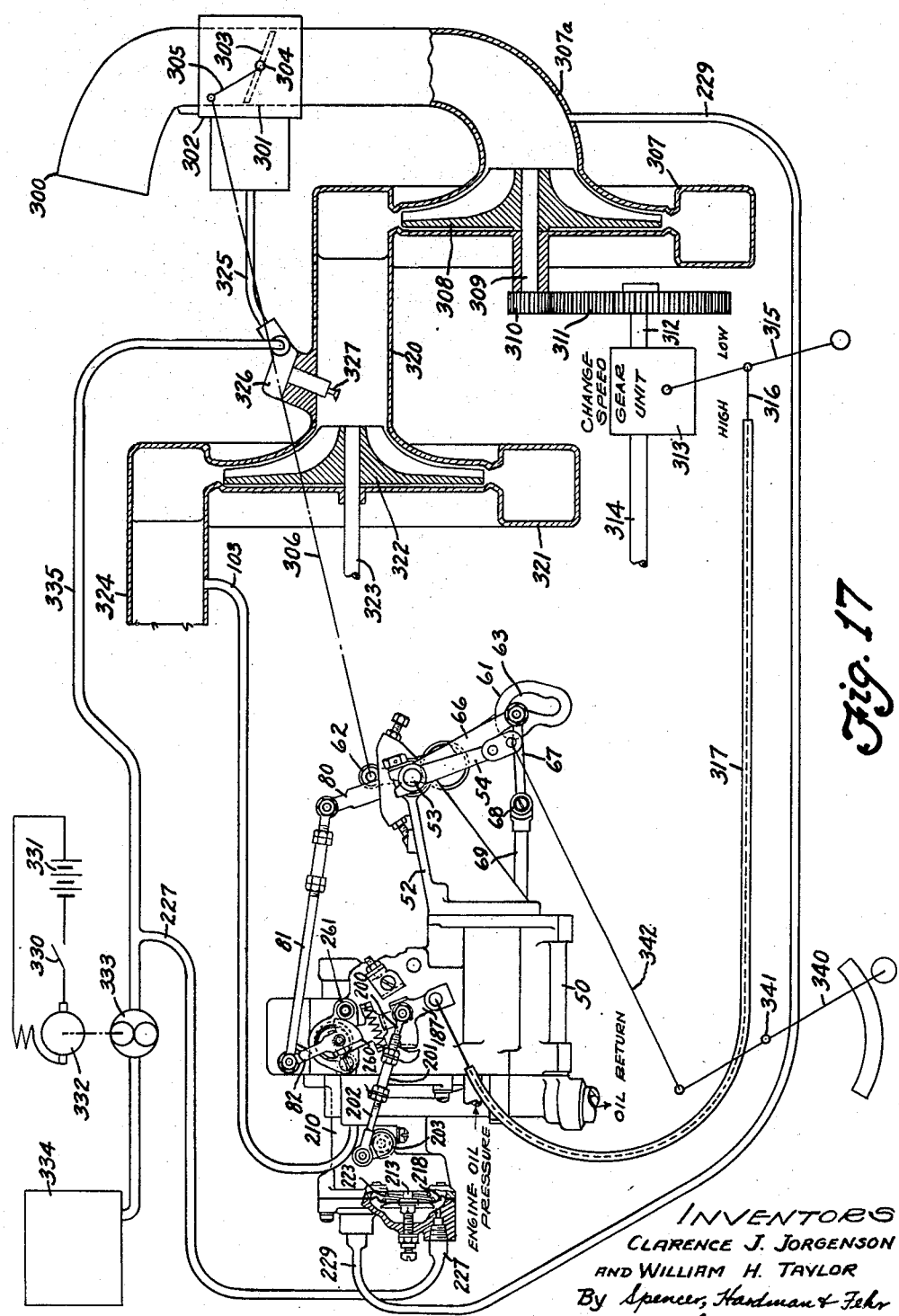

Patented Mar. 23, 1954

2,672,851

UNITED STATES PATENT OFFICE 2,672,851

PRESSURE REGULATOR

Clarence H. Jorgensen, Rochester, N. Y., and William H. Taylor, Anderson, Ind., assignors to General Motors Corporation, Detroit, Mich., a corporation of Delaware Application April 11, 1945, Serial No. 587,764

6 Claims. (Cl. 123—25)

This invention relates to apparatus for regulating the intake pressure of a supercharged internal combustion engine for use on airplanes and more particularly for use with an engine having supercharger driven thereby through a change speed transmission unit and having apparatus for injecting liquid into the air duct of the engine to prevent detonation thereof at high intake pressure.

It is an object of the present invention to provide an intake pressure regulator having pressure selecting means which is controlled jointly by a manually operated lever which selects pressures according to a normal schedule of pressures and lever positions, by means operated in response to shifting the transmission unit into high gear for modifying the normal schedule and by means which permits pressures in the highest range to be obtained only when the liquid injection is present. The pressure regulator is adapted for use with a control system which provides for bleeding the duct connecting the engine intake with a pressure responsive bellows of the regulator when the transmission is in high gear. Therefore, although the modified pressure schedule is lower than the normal schedule, the intake pressures obtainable under the modified schedule are actually higher than those obtainable under the normal schedule.

Further objects and advantages of the present invention will be apparent from the following description, reference being had to the accompanying drawings wherein preferred embodiment of the present invention is clearly shown.

In the drawings:

Fig. 1 is an end view of a pressure regulator embodying the present invention a portion of a housing member thereof being omitted in order to show part of the interior construction.

Figs. 2 and 4, taken together, constitute a side view of the regulator.

Fig. 3 is a fragmentary sectional view on line 3—3 of Fig. 2.

Fig. 6 is a sectional view on line 6—6 of Fig. 1.

Fig. 7 is a fragmentary sectional view on line 7—7 of Fig. 6.

Fig. 8 is a fragmentary sectional view on line 8—8 of Fig. 6.

Fig. 9 is a sectional view on line 9—9 of Fig. 6.

Fig. 10 is a sectional view on line 10—10 of Figs. 9 and 11.

Fig. 11 is a sectional view on line 11—11 of Fig. 6.

Fig. 12 is a fragmentary top view of the regulator looking in the direction of arrow 12 of Fig. 2, a portion thereof being shown in section of line 12'—12' of Fig. 2.

Figs. 13, 14 and 15 are diagrams illustrating the operation of the controller.

Fig. 16 is a chart showing the relation of selected pressures and throttle openings to datum lever positions for a typical installation.

Fig. 17 is a diagrammatic view of the entire installation.

Figure 5:
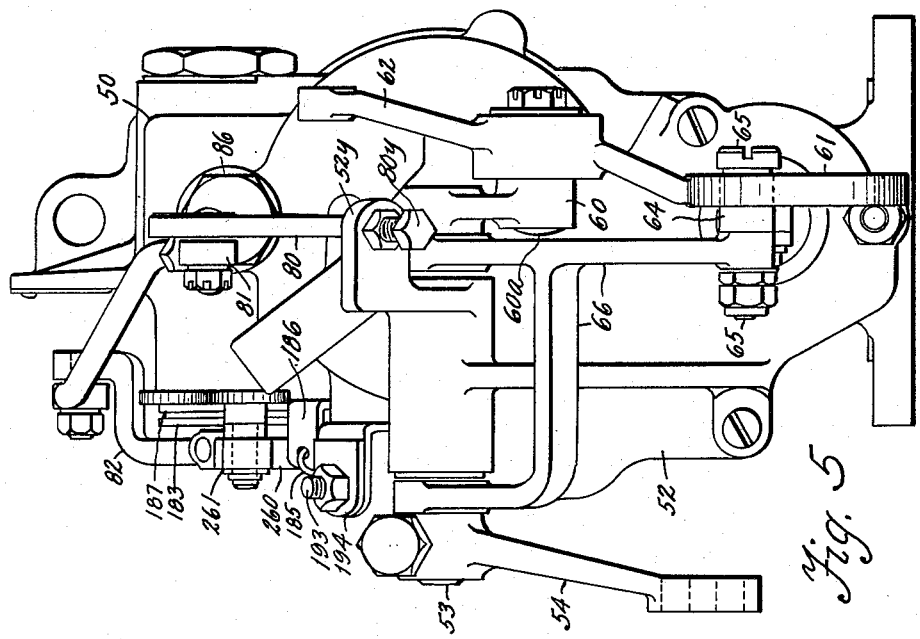
Fig. 5 is an end view looking in the direction of arrow 5 of Fig. 4.
Figure 4:
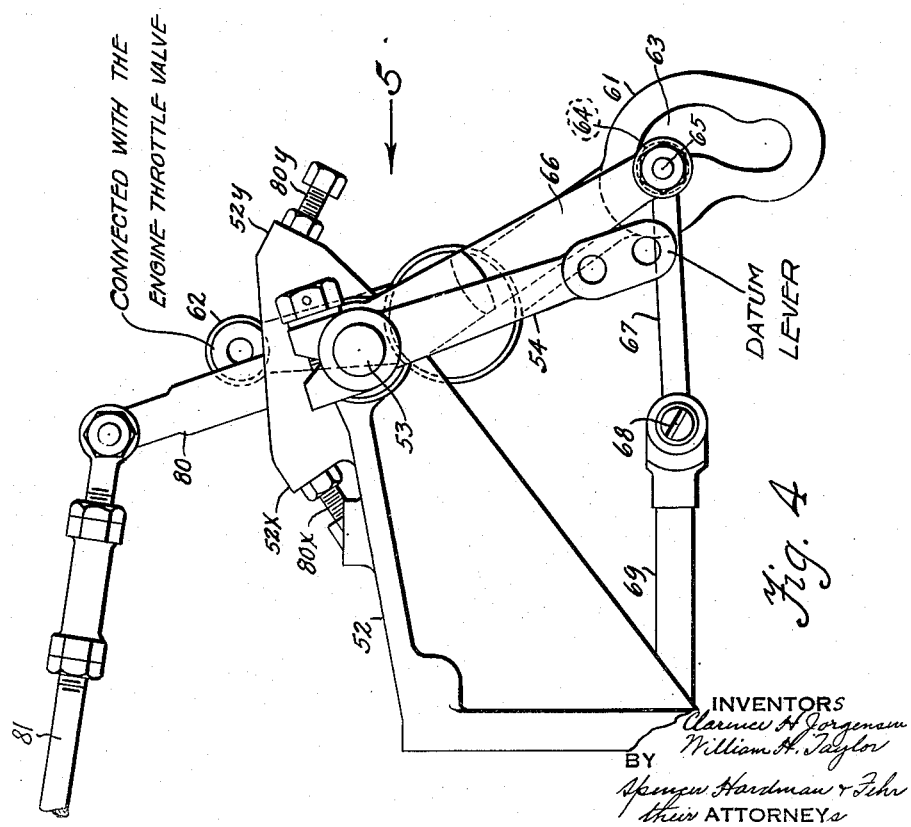

The pressure regulator has a housing 50 (Fig. 2) having feet 51 by which it is mounted upon a stationary part such as the frame of the engine and a bracket 52 (Fig. 4) supported by the housing 50. Bracket 52 supports a rotatable shaft 53 which is connected with the main control or datum lever 54 which is operated by the pilot. The shaft 53 is connected with a short lever 60, the lower end of which pivotally supports a fulcrum 60a for a lever having arms 61 and 62. The lower end of arm 61 provides a cam slot 63 for receiving a roller 64 pivotally supported by a pin or stud 65 carried by an idle lever 66 which is journalled upon the shaft 53 but is not driven thereby. The pin 65 serves also to connect the lever 61 with a link 67 pivotally connected at 68 with the piston rod 69 of an hydraulic servomotor to be described. Lever arm 62 is connected in any suitable manner with a throttle valve (not shown) located in the air or fuel-mixture duct leading to the intake manifold of the engine.

Shaft 53 is connected with a lever 80 which is connected by a link 81 with a lever 82 attached to a shaft 83 (Fig. 3) carrying a pressure selecting cam 84 (Fig. 6). A spring retained by plug 86 urges a lever 87 into engagement with the cam 84 unless the lever 87 is prevented from doing so by means to be described later. Lever 87 is pivotally supported by a pin 88 carried by a bridge 89 connecting bellows end plates 90 and 91. Plate 90 is connected with bellows 92 which is connected with a mounting ring 93 located with respect to housing 50 by dowel pins, such as 94, and secured thereto by screws, such as 95. A sealing gasket 96 is located between the housing 50 and the mounting ring 93. A spring 97 is confined under compression between the plate 90 and a washer 98 retained by a split snap-ring 99 received by a groove in the ring 93. The interior of bellows 92 is connected by a passage 100, a passage 101, and a passage 102 (Fig. 11) with a pipe 103 shown in Fig. 1 in section and in elevation in Fig. 2. Pipe 103 is connected with the engine intake manifold (not shown). Therefore interior of bellows 92 is subjected to engine intake pressure.

The plate 91 (Fig. 6) is connected with an evacuated bellows 105 connected with a plate 106. Between the plates 91 and 106 springs 107 and 108 are confined under compression. The areas of the two bellows 92 and 105 are substantially equal so that the movement of the pin 88 is effected only in response to variations in engine intake pressure and is not affected by variations in altitude. The springs 97, 107 and 108 are so related that the relation between the movements of the pin 88 and the changes in engine intake pressure is substantially a linear relation.

The lower end of lever 87 is connected by a pin 110 with a clevis 111 connected by flexible rod 112 with a valve 113 having lands 114 and 115 and slidable within a valve guide 116 having three annular grooves 117, 118 and 119 connected, respectively, with ports 120, 121 and 122 communicating with the interior of the sleeve 116. It is apparent that the valve lands 114 and 115, respectively, control the ports 120 and 122. The valve guide 116 has a flange 125 received by a counterbore in the housing 50 and urged therein by a spring 126 confined in a pocket 127 provided by the bracket 52.

The housing 50 provides a cylinder 130 which receives a piston 131 attached to the piston rod 69. Rod 69 is slidable through a cylinder end member 132 and a bushing 133 in a cylinder end member 134 retained by the bracket 52. Member 134 carries a sealing member 135 closely fitting around the rod 69. A spring 136, confined under compression between the piston 131 and the cylinder end member 132, serves to move the piston 134 toward the right in case of failure of oil pressure.

Referring to Fig. 2, oil under pressure for effecting movement of the piston 131, enters the pressure regulator through a pipe 140 which as shown in Fig. 1 is connected with a passage 141 which is connected with the groove 118 (Fig. 6) by a cross passage 142. Groove 119 (Fig. 6) is connected with the right end of cylinder 130 by a passage 143. Groove 117 (Fig. 10) is connected by passages 144, 145 and 146 (also Fig. 6) with the left end of cylinder 130. If valve 113 is moved to the right of the position shown in Fig. 6, ports 121 will be connected with ports 122 and ports 120 will be connected with the left end of the valve guide 116. Then pressure oil will flow into the right end of the cylinder 130 to cause the piston 131 to move left, thereby causing the oil at the left side of the piston to pass from the cylinder 130 through the passages 146, 145 and 144 (Fig. 10), the groove 117, the ports 120, the valve guide 116 into the bellows chamber 150 (Figs. 6 and 10). When the valve 113 is moved to the left of the position in Fig. 6, ports 120 are connected with ports 121 and ports 122 are connected with the right end of the guide 116. The pressure oil will flow from the inlet 142 (Fig. 6) through the ports 121 and 120, groove 117 and passages 144, 145 and 146 to the left end of the cylinder 130, thereby urging the piston 131 toward the right and causing the oil to the right thereof to flow out through passage 143, groove 119, ports 122, guide 116, pocket 127 and a passage 151 connected with the chamber 150.

The chamber 150 is enclosed by a plate 160 attached to the housing 50 and sealed thereto by gasket 161. In order to drain oil entirely from the chamber 150, the plate 160 provides a passage 162 leading to a recess 163 therein which receives the piston rod 69 when moved toward the left. As shown in Fig. 1, the recess 163 is connected by a small diameter passage 164 with a drain passage 165 provided by the plate 160, the lower end of the passage 165 being pipe-tapped at 166 to receive a drain pipe 166a (Fig. 2). The upper end of passage 165 is connected by a short cross passage 167 (Fig. 1) with the upper portion of the chamber 150. Because the oil, exhausted from the ends of the servo-cylinder 130, flows into the chamber 150 at a rate greater than it can be drained by the small passage 164, this oil will fill the chamber 150 up to the lowest part of the passage 167 (Fig. 1). Therefore, during the operation of the regulator the chamber 150 is filled with oil, which serves as means for damping vibrations which would hinder the proper functioning of the bellows in controlling the valve 113.

In the chart, shown in Fig. 16, the heavy line O—A—B—C represents pressure selections for various positions of the datum lever 54. When the datum lever is in zero position the throttle valve is in idle position, as indicated by R on line R—S. If for example, a manifold pressure of 44″ Hg absolute is required for take-off, the lever 54 is moved by the pilot to its 43° position indicated by the dotted vertical line in Fig. 16. This movement of lever 54 causes lever 80 to move to the position shown in Fig. 4 and the lever 82 to move into the position shown in Fig. 2 and the cam 84 to move into the position 84a shown in dot-dash-line in Fig. 6. This movement of lever 54 effects also an opening movement of the throttle valve due to the fact that, as lever 54 moves counterclockwise, the lever 60 carrying the fulcrum 60a of lever 61 moves also counterclockwise. But, because movement of the lower end of the lever arm 61 is restricted by the roller 64 within the cam slot 63, the floating lever arms 61 and 62 must move clockwise about the fulcrum 60a, thereby effecting an opening movement of the throttle valve, which is sufficient for take-off or safe-landing but is insufficient for an ascent very far above sea level since the pressure demanded cannot be obtained unless the throttle opens wider. Therefore, the servo-motor is caused to open the throttle wider by reason of the fact that the cam 84 has been moved to the 84a position (Fig. 6, for example) such movement causing the lever 87 to rotate counterclockwise about the pivot 88 and the valve 113 to move right to admit pressure oil to the right end of cylinder 130. The piston 131 moves left and effects through the rod 69, pivot 88, link 67, pin 65, and roller 64 a further clockwise movement of the levers 61 and 62 about the fulcrum 60a. This effects an increase of opening of throttle valve and an increase of pressure in the manifold. As the manifold pressure increases pivot pin 88 moves toward position 88a which is reached when the manifold pressure becomes 44″ Hg abs. or equal to the selected pressure. This causes the valve 113 to return to equilibrium status and operation of the servo-motor ceases. The position of equilibrium of lever 87 is at 87a represented by dot-dash lines. As altitude increases the pressure in the bellows 92 tends to fall, but the servo-motor keeps opening the throttle in order to maintain the selected pressure. The selected pressure will be maintained up to an altitude requiring the throttle valve to wide-open. That altitude is the critical altitude for the pressure selected because, at that altitude, the pressure falls unless other means are provided for obtaining an increase of supercharging action.

In order that the valve 113 will be in equilibrium position when the cam 84 is in some particular position such as the position 84a (Fig. 6) demanding 44" manifold pressure and the pressure in the bellows 92 is 44", it may be necessary to make an initial or factory adjustment of the bellows system. This is accomplished by adjusting the position of the bellows plate 106 which, as shown in Fig. 6, has a stem 170 slidable in a recess 171 provided by the plate 160. The stem 170 has a groove 172 (Fig. 7) receiving a pin eccentrically provided by a rod 174 having a portion 175 screw-threadedly received by the plate 160. By means of a screw-driver, the rod 174 can be turned to rotate the pin 173 to shift the stem 170 and the bellows system into the required position. The rod 174 is secured in the required position of adjustment by tightening a lock nut 176 threadedly engaging the threaded portion 175 of the rod 174.

As explained in detail in our copening application, Serial No. 483,438, filed April 17, 1943 and now abandoned, the movements imparted to the throttle valve manually by the pilot's lever and automatically by the hydraulic servo-motor are such that the throttle valve will be moved into wide open position at critical altitude for any pressure selection within the operating range. For example, the broken line R—S in Fig. 16 represents the manually effected throttle opening for various positions of the datum lever 54 and the broken line T—U represents the total throttle opening effected manually and automatically. For an engine having an idle setting of the throttle at 18°, 72° throttle opening would move the throttle wide open. Therefore, the throttle is practically wide open for all pressure selections within the operating range corresponding to datum lever positions 25° to 60°.

Referring to Figs. 2, 3 and 12, the shaft 83 which provides the pressure selecting cam 84 is journalled eccentrically in a shaft 180 which is journalled concentrically in a shaft 181 which is journalled in a bearing 182 provided by housing 50. The shaft 180 is attached to an arm 183 having an ear 184 connected by a spring 185 with an ear 186 of an arm 187 which is attached to the tubular shaft 181. The approach of the two ears 184 and 186 by the action of the spring 185 is limited by the engagement of the part 187a of arm 187 with the part 183a of the arm 183 as shown in Fig. 2. Therefore the arms 183 and 187 operate, except under certain circumstances, as one lever arm. The arm 187 is connected in any suitable manner with the means (not shown) for controlling the speed status of the transmission mechanism from the engine to an auxiliary supercharger. Clockwise motion of lever 187 is limited by the engagement of its ear 190 with a lug 191 of the housing 50; and counterclockwise motion is limited by the engagement of its ear 192 with a stop screw 193 adjustably carried by a stop bracket 194 attached by a screw 195 to housing 50. Counterclockwise movement of the arm 187 from the position shown in Fig. 2 is effected concurrently with the change of status of the transmission mechanism from low to high. This causes a shifting of the axis of shaft 83 from the position indicated by the dot 83 in Fig. 14 to the position indicated by the dot 83' for a purpose to be described.

Lever 187 is connected by a link (comprising an end-eye 200, turn buckle 201 and an end-eye 202) with a lever 203 attached to a shaft 204 (see Fig. 8) journalled in a tubular bearing boss 205 provided by a housing 210 integral with the plate 160. The shaft 204 is retained by screw 206, the upper end of which is received by groove 207 provided by the shaft 204. Shaft 204 carries an eccentric pin 208 providing a journal for a bushing 209 fixed within a lever 211. The forked lower end of the lever 211 is connected by pin 212 with a rod 213 providing a shoulder 214. Between the shoulder 214 (Fig. 6) and a nut 215 threadedly engaging the rod 213, there are secured a plain washer 216, a cupped washer 217, a diaphragm 218, a cupped washer 219 and a plain washer 220. The diaphragm 218 is a part of a gasket sealing the joint between the housing 210 and a cover 221 attached by screws 222. A spring 223, confined under compression between a portion of the housing 210 and the washer 217, urges the rod 213 toward the left until it engages an adjustable stop screw 224 threaded through the cover 221 and secured in the desired position of adjustment by a self-locking nut 225. The diaphragm 218 separates the space within the housing 210 from a chamber 226 intended for the reception of injection liquid conducted thereto by pipe 227 and a passage 227a in the cover 221. The space within the housing 210 is connected by a passage 228 in cover 221 and by a pipe 229 with the intake of the auxiliary supercharger. The upper end of lever 211 (Fig. 6) is engageable with the head 230 of a rod 231 guided by a bushing 232 carried by the plate 160. The head 230 is urged against the lever 211 by a spring 233. The right end of the rod 231 is engageable with the lever 87 for the purpose of preventing it from following the cam 84 under certain conditions and to allow it to follow the cam when a liquid injection system is operating.

The liquid injection system may, for example, be similar to that disclosed in the copending application of Trisler et al. Serial No. 550,232, filed August 19, 1944. The system of that application includes means responsive to the proper functioning of the liquid injection apparatus for causing injection liquid to flow under pressure to a diaphragm chamber such as chamber 226 (Fig. 6). So long as liquid injection continues to function properly, the pressure at the left of the diaphragm 218 will overcome the spring 223 and the pressure at the right of the diaphragm and rod 213 will move right. When, liquid injection diminishes below a certain rate, due to failure to function properly or to consumption of the liquid, the diaphragm 218 and the rod 213 move left to normal position under the pressure of spring 223 and the supercharger intake pressure, said pressures being in excess of the pressure on the left side of the diaphragm when water injection becomes insufficient to prevent detonation or ceases entirely.

The present pressure regulator is adapted for use with a control system which provides for bleeding the connector (such as pipe 103) between the engine intake manifold and the pressure responsive bellows 92 (Fig. 6).

Line O—A—B—C of Fig. 16 represents the schedule of pressure selections when the auxiliary supercharger is operating on the low speed ratio. With axis of cam 84 at 83 (Fig. 14), lever 54 is at the 43° position, cam 84 is at 84a and touches lever 87 in its equilibrium position 87—44 for the 44" pressure selection. When lever 54 is at the 50° position, cam 84 is at 84b and touches lever 87 in its equilibrium position 87—48 for 48" pressure selection. When lever 54 is at the 60° position cam 84 is at 84c and touches lever 87 in its equilibrium position 87—52 for 52" pressure selection.

Concurrently with increasing the speed ratio of the drive between the engine and the auxiliary supercharger lever 187 is caused to move by means not shown into the position represented by the dot-dash circle 187' (Fig. 2). As shown in Fig. 13, this causes the lever 211 to move into the position 211' and the head 230 to move into the position 230' and the end of the rod 231 which carries the head 230 to move into the position 231' in which it touches lever 87 in the position 87—44, which means that lever 87 cannot have an equilibrium position corresponding to a pressure higher than 44". Furthermore, this movement of the lever 187 into the position 187' causes the axis of shaft 83 to move from the point 83 (Fig. 14) to the point 83'. Therefore, when the datum lever 54 is in its 43° position, cam lever 82 will be in position 82a' and the cam will be in the position 84a' in which position the lever 87 is tangent thereto in its equilibrium position represented by line 87—40. This means, that, when datum lever 54 is in the 43° position, the selected pressure is 40" instead of 44" when the auxiliary supercharger was operating at low speed. When the datum lever 54 is in the 50° position, the cam lever 82 will be in position 82b' and cam 84 will be in the position 84b' in which it is tangentially engaged by line 87—44, which means that the pressure selection for the 50° position of the datum lever 54 the auxiliary supercharger is operating at high speed, is 44" instead of 48" when the supercharger was operating at low speed. When datum lever 54 is in the 60° position, either with low blower or high blower, the cam 84 will be in the position 84c. Although the lever 187 may still be in position 187' with high speed operation of the supercharger, the axis of cam shaft 83 will not be at 83' in to the 60° position of the lever 54 because, when the cam shaft 82 is approaching its position 82c corresponding to the 60° position of lever 54, the axis of cam shaft 83 is caused to move clockwise from position 83' to the position 83 in Figs. 14 and 15. This is effected by the engagement of a cam 260 provided by lever 82 with a roller 261 mounted on a bracket 262 and secured to the housing 50 by screw 263. When the lever 82 is in the position 82a, cam 260 is in position 260a and when lever 82 is in position 82a', cam 260 is in position 260a'. Suppose that the supercharger is still in low speed operation, as lever 54 moves from its 43° position (corresponding to which the cam 260 is at 260a) into the 60° position, cam 260 moves from 260a to 260c in which the cam 260 becomes tangent to roller 261. However, if the supercharger is in high speed operation, the position of cam 260, corresponding to the 43° position of lever 54, is 260a'. If, during the movement of lever 54 from the 43° position, there had been no roller 261 to engage the cam 160, the cam 260 would have moved from the position 260a' to the position 260c' which overlaps the circle representing the roller 261 as shown in Fig. 15. Since the roller 261 is engaged by the cam 260 when moving from 260a' toward 260c', the cam 260 begins to engage the roller 261 after the lever 54 moves slightly past the 43° position; and, as the lever 54 continues moving toward its 60° position, the cam 260 pushes against the roller 261. This causes the axis of shaft 83 to move from 83' (Fig. 15) to 83, thereby causing the cam 260 to be located in position 260c instead of the position 260c'. Although the lever 187 is maintained at position 187' (Fig. 2), the lever 183 is free to move clockwise away from lever 187, the spring 185 stretching during this movement. If there were no pin 231 to obstruct movement of the lever 87 toward the left, the schedule of pressure selections for high speed supercharger operation would be that represented by the line O'—A'—B'—C' (Fig. 16) which is below the line O—A—B—C except at C. However, since the pipe 103 is bled when the supercharger transmission is in high gear, the manifold pressures actually obtained are higher than the pressure regulator apparently demands according to line O'—A'—B'—C'. For example, the actual intake pressures may be that represented by the dot-dash line D—E—F which is above O—A—B—C.

For high speed supercharger operation, without water injection, the highest pressure selection is 44" since the rod 231 is in position 231a. Therefore the selected pressures for high speed supercharger operation, without liquid injection, are those represented by line O'—A'—B'—C' and the pressure actually obtained may be those represented by line D—E—C. When liquid injection is functioning properly the pressure upon the left side of the diaphragm 218 (Fig. 6) exceeds the force of spring 223 and supercharger intake pressure on the right side of the diaphragm, and rod 213 moves right to cause lever 211 to move counterclockwise so that the spring 233 is released to move the pin 231 to the left, thereby allowing the lever 87 to follow the cam 84 into whatever position it may have been placed by the datum lever 54. Therefore, when operating with high speed supercharger operation and with liquid injection, the selected pressures are those represented by O'—A'—B'—C and the pressures actually obtained are those represented by D—E—F. However, should liquid injection fail while high speed supercharger operation continues, any apparent selected pressure along the line B'—C will immediately fall to the line B'—C' and any actual pressure along the line E—F will fall to the line E—C. Therefore C or about 52" is the highest pressure which can be obtained for low-speed supercharger operation with or without liquid injection and for high-speed supercharger operation without liquid injection.

It is interesting to note, that, when the system operates with low speed supercharger operation and without liquid injection, the actual intake pressures are those represented by O—B—C; and that, when the system operates with high speed supercharger operation and liquid injection, the actual intake pressures are those represented by the line D—E—F in which the part E—F thereof has substantially greater slope than the part B—C of the line O—A—B—C. No change in cam 84 has been made to effect this. During high speed supercharger operation this is accomplished by virtue of engagement of cam 260 with the roller 261 while lever 54 moves between its 43° and 60° positions, thereby causing the line B'—C to bend upwardly to meet the point C. The line E—F representing actual intake pressure will have practically the same slope as line B'—C. More specifically, as lever 54 moves from the 50° to the 60° position, the actual pressure obtained with low speed supercharger operation increases from 48" to 52" or 4"; and, during high speed supercharger operation with liquid injection, when lever 54 moves from the 50° to the 60° position, the actual pressure increases from about 52″ to 60″, or 8″, thus doubling the rate of pressure increase for the same movement of lever 54. It is advantageous to be able to increase actual intake pressure rapidly by movement of the datum lever 54 in the emergency range, when such increase can safely be made with liquid injection.

Referring to the diagram (Fig. 17), a scoop 300 directs air to the air passage 301 of a carburetor 302 having an air controlling throttle 303 supported by a shaft 304 connected by a lever 305 and a link 306 with lever 62 of the regulator. Air passage 301 is connected with the inlet duct 307a of an auxiliary supercharger 307 having an impeller 308 attached to a shaft 309 connected by gears 310 and 311 with a shaft 312 connected by a change speed unit 313 with an engine driven shaft 314. The gearing is controlled by lever 315. When lever 315 is in the low position, the engine drives the impeller 308 at relatively low speed. Lever 315 is connected by Bowden wire 316 in a tube 317 with lever 187. Clockwise movement of lever 315 into high position causes the engine to drive the impeller 308 at relatively high speed and effects through the wire 316 counterclockwise movement of lever 187 for the purpose stated.

The outlet of auxiliary supercharger 307 is connected with the inlet 320 of the main supercharger 321 having an impeller 322 driven directly by the engine through a shaft 323. The outlet of the supercharger 321 is connected with the engine intake manifold by duct 324. Pipe 103 connects duct 324 with the bellows 92 (Fig. 6) of the pressure regulator.

In proportion to the amount of air flowing through it, the carburetor permits the passage of a metered amount of liquid fluid to a pipe 325 connected with a nozzle block 326 and terminating in a nozzle 327 extending into the duct 320. When it is desirable to operate with liquid injection, a switch 330 is closed to connect a battery 331 with an electric motor 332 thereby causing operation of a pump 333 which draws injection fluid, such as alcohol-water mixture, from a tank 334 and forces it through a pipe 335 connected with the nozzle block 326 which provides for conduction of the injection fluid to the nozzle 327. The pipe 227 which is connected with the space to the left of diaphragm 218 is connected with pipe 335 so that, when the pump 333 operates to force injection fluid through the pipe 335, the diaphragm 218 will move, for the purpose stated, to the right against the action of spring 223 and the pressure of air in the housing 210 which the pipe 229 connects with the inlet of the auxiliary supercharger. A pilot's lever 340, pivoted at 341, is connected by a link 342 with the datum or main control lever 54 of the regulator.

It will be understood that the pressure values stated herein have been chosen merely to illustrate the operation of the regulator. Obviously the regulator is adapted for other ranges of pressure selections.

While the embodiment of the present invention as herein disclosed, constitutes a preferred form, it is to be understood that other forms might be adopted, all coming within the scope of the claims which follow.

What is claimed is as follows:

1. A pressure regulator for controlling the throttle valve of an internal combustion engine comprising a manually controlled pressure selecting means, an element responsive to engine intake pressure, a throttle-valve-positioning servomotor under joint control by said element and said pressure selecting means, manually controlled means for modifying the pressure selected by the first means, means operated thereby for limiting the pressure obtainable, means for injecting a liquid anti-detonant under pressure into the engine intake passage, and a pressure responsive device actuated by the injection liquid under pressure for rendering the pressure limiting means inoperative.

2. A pressure regulator for controlling the throttle valve of an internal combustion engine comprising a manually controlled rotary pressure selecting cam, a cam follower, an element responsive to engine intake pressure, a throttle-valve-positioning servo-motor under joint control by said cam follower and said element, manually controlled means for laterally shifting the cam in order to modify the pressure selected by the cam, a stop for limiting travel of the follower with the cam, means for injecting a liquid anti-detonant under pressure into the engine intake passage, a pressure-responsive device adapted for control by the injection-liquid, and means for locating the stop in a cam-follower limiting position when the pressure selection is modified by shifting the cam laterally and for locating the stop in a non-effective position when injection-liquid exists under pressure.

3. A pressure regulator for controlling the throttle valve of an internal combustion engine comprising a servo-motor, a main-control or datum lever, means under joint control by the servo-motor and the datum lever for positioning a throttle valve, a rotary cam operated by the datum lever for selecting pressures according to a normal schedule of pressures and lever positions, a cam follower, a bellows responsive to engine intake pressure, means under control by the cam follower and the bellows for controlling the servo-motor, a second manually controlled lever, means operated thereby for shifting the cam laterally to effect a modification of the pressure schedule without changing position of the datum lever, a stop for limiting travel of the cam follower with the cam, means for injecting a liquid anti-detonant under pressure into the engine intake passage, a pressure-responsive device adapted for control by the injection liquid, and means under control by the second lever for moving the stop from non-effective to effective position when the second lever is moved to effect a modification of the pressure schedule and under control by the pressure-responsive device for moving the stop from effective to non-effective position when injection liquid exists under pressure.

4. A pressure regulator for controlling the throttle valve of an internal combustion engine comprising a servo-motor, a main-control or datum lever, means under joint control by the servo-motor and the datum lever for positioning a throttle valve, a rotary cam operated by the datum lever for selecting pressures according to a normal schedule of pressures and lever positions, a cam follower, a bellows responsive to engine intake pressure, means under control by the cam follower and the bellows for controlling the servo-motor, a second manually controlled lever, means operated thereby for shifting the cam laterally to effect a modification of the pressure schedule without changing position of the datum lever, a stop for limiting travel of the cam follower with the cam, means for injecting a liquid anti-detonant under pressure into the engine intake passage, a pressure-responsive device adapted for control by the injection liquid, means under control by the second lever for moving the stop from non-effective to effective position when the second lever is moved to effect a modification of the pressure schedule and under control by the pressure-responsive device for moving the stop from effective to non-effective position when injection liquid exists under pressure and means operated by movement of the datum lever in the upper range of pressure selecting positions to the position for highest pressure selection for causing the modified schedule to return to the normal schedule while the second lever remains in schedule modifying position.

5. A pressure regulator for controlling the throttle valve of an internal combustion engine comprising a servo-motor, a main-control or datum lever, means under joint control by the servo-motor and the datum lever for positioning a throttle valve, a rotary cam operated by the datum lever for selecting pressures according to a normal schedule of pressures and lever positions, a cam follower, a bellows responsive to engine intake pressure, means under control by the cam follower and the bellows for controlling the servo-motor, a shaft eccentrically supporting the cam, manually operable means for rotating the shaft in order to shift the cam laterally and to effect a modification of the pressure schedule without changing position of the datum lever, a stop for limiting travel of the cam follower with the cam, means for injecting a liquid anti-detonant under pressure into the engine intake passage, a pressure-responsive device adapted for control by the injection fluid, a floating lever for transmitting motion from the pressure-responsive device to the stop, and means actuated concurrently with the pressure-modifying means for shifting the fulcrum of the floating lever.

6. A pressure regulator for controlling the throttle valve of an internal combustion engine comprising a servo-motor, a main control or datum lever, means under joint control by the servo-motor and the datum lever for positioning a throttle valve, a rotary cam operated by the datum lever for selecting pressures according to a normal schedule of pressures and lever positions, a cam follower, a bellows responsive to engine intake pressure, means under control by the cam follower and the bellows for controlling the servo-motor, a shaft eccentrically supporting the cam, manually operable means including a motion-transmitting spring for rotating the shaft in order to shift the cam laterally and to effect a modification of the pressure schedule without changing position of the datum lever, means for restoring the normal schedule when the datum lever is moved into a position of high pressure selection while the setting of the schedule modifying means remains unchanged, said restoring means comprising a fixed cam follower and a co-operating cam movable with the datum lever, said motion transmitting spring yielding to permit the return of the cam laterally to normal axial position, a stop for limiting travel of the cam follower with the cam, means for injecting a liquid anti-detonant under pressure into the engine intake passage, a pressure-responsive device adapted for control by the injection-liquid, a floating lever for transmitting motion from the pressure-responsive device to the stop, and means actuated concurrently with the pressure-modifying means for shifting the fulcrum of the floating lever.

CLARENCE H. JORGENSEN.
WILLIAM H. TAYLOR.

References Cited in the file of this patent

UNITED STATES PATENTS

| Number | Name | Date |
|---|---|---|
| 2,031,527 | Dodson | Feb. 18, 1936 |
| 2,383,198 | Jorgensen | Aug. 21, 1945 |
| 2,392,565 | Anderson et al. | Jan. 8, 1946 |
| 2,431,590 | Smith | Nov. 25, 1947 |